(12) United States Patent
Lund

(10) Patent No.: US 6,702,399 B2
(45) Date of Patent: *Mar. 9, 2004

(54) SHOCK ABSORBING BICYCLE WHEEL HUB

(76) Inventor: Morten Andre Lund, 1291 Simpson Way, suite D, Escondido, CA (US) 92029-1434

( * ) Notice: Subject to any disclaimer, the term of this patent is extended or adjusted under 35 U.S.C. 154(b) by 0 days.

This patent is subject to a terminal disclaimer.

(21) Appl. No.: 10/205,041

(22) Filed: Jul. 24, 2002

(65) Prior Publication Data

US 2002/0185910 A1 Dec. 12, 2002

Related U.S. Application Data

(63) Continuation-in-part of application No. 10/131,850, filed on Apr. 24, 2002, now abandoned, which is a continuation-in-part of application No. 09/846,598, filed on Apr. 30, 2001, now Pat. No. 6,406,101.

(51) Int. Cl.[7] .............................................. B60B 27/00
(52) U.S. Cl. ........................ 301/110.5; 152/40; 152/44
(58) Field of Search ........................... 301/5.301, 5.305, 301/110.5, 110.6, 105.1; 152/17, 40, 42, 44, 45–51, 69, 80

(56) References Cited

U.S. PATENT DOCUMENTS

| | | | |
|---|---|---|---|
| 1,073,508 A | * | 9/1913 | Moser |
| 1,185,098 A | * | 5/1916 | Hopkins |
| 1,457,538 A | | 6/1923 | Mark et al. |
| 3,072,169 A | | 1/1963 | Hastings, Jr. |
| 4,294,491 A | | 10/1981 | Black |
| 4,295,686 A | | 10/1981 | Black |
| 4,602,822 A | | 7/1986 | Kim et al. |
| 4,755,005 A | | 7/1988 | Tsai |
| 5,104,201 A | * | 4/1992 | Ross ........................ 301/110.5 |
| 5,393,078 A | * | 2/1995 | Bourdeau ................. 152/17 X |
| 6,019,435 A | | 2/2000 | Bach |
| 6,406,101 B2 | * | 6/2002 | Lund ........................ 301/110.5 |

FOREIGN PATENT DOCUMENTS

FR 0676397 * 5/1991

* cited by examiner

Primary Examiner—Russell D. Stormer
(74) Attorney, Agent, or Firm—Gene Scott-Patent Law & Venture Group (57) ABSTRACT

A shock absorbing bicycle wheel hub apparatus uses an open ended, cylindrical shock absorber housing mounted concentrically within a wheel hub. The wheel hub is adapted for rotation about the shock absorber housing. A pivot tube is axially aligned with the shock absorber housing and rotationally mounted within its sidewall. Terminal ends of the pivot rod engage cover plates fixedly mounted thereon. A pressure tube is axially aligned with the shock absorber housing and extends through it so that its terminal ends may be fixed in the cover plates. A shock-absorbing medium is compressively positioned between the pressure tube and an interior surface of the shock absorber housing. The cover plates engage a bicycle fork so that weight supported by the bicycle fork is transmitted through the cover plates and the pivot tube and pressure tube, to the shock absorbing medium, and thereby, through the shock absorber housing and the wheel hub to a wheel of the bicycle. Likewise, road shocks are transmitted through the shock-absorbing medium in the same way.

9 Claims, 6 Drawing Sheets

SHOCK ABSORBING BICYCLE WHEEL HUB

RELATED APPLICATIONS

This is a continuation-in-part application of a prior filed and currently pending application having Ser. No. 10/131,850 and filing date Apr. 24, 2002 (now abandoned). Further related applications are Ser. No. 09/846,598 file on Apr. 30, 2001 now U.S. Pat. No. 6,406,101, and international (PCT) application US 0143628 filed Nov. 21, 2001 claiming priority of the '598 application.

BACKGROUND OF THE INVENTION

1. Field of the Invention

This invention relates generally to shock absorbing systems for vehicles such as bicycles and a wheel mounting system providing a shock-absorbing element contained within a wheel hub.

2. Description of Related Art

The following art defines the present state of this field:

Mark et al, U.S. Pat. No. 1,457,538 describes a hub having pockets therein; a felloe; an annular ring reinforcing said felloe within said felloe; outwardly curved spring spokes, each mounted within one of the pockets of said hub, each spoke having an inwardly curved end resting upon the outwardly curved portion of the adjacent spoke; a thimble mounted within said felloe respective to each of said spokes; a raised seat upon said annular ring for each of said spokes; and a bolt for each of said spokes, said bolt passing through the spoke and its raised seat upon said annular ring and being threaded into one of said thimbles.

Hastings, Jr., U.S. Pat. No. 3,072,169 describes a resilient wheel comprising an axle member, mounting means supported from said axle member having first and second annular axially spaced portions, an axle retainer member secured at one end of the axle member for supporting one of said mounting portions and maintaining a fixed axial spacing of said first and second portions, said axle and axle retainer members together comprising axle means, said mounting means being non-rotatable and each portion thereof including resilient shear rings, bearing means axially intermediate said first and second portions, and rim means mounted upon said bearing means for rotation radially outwardly of the mounting means.

Black, U.S. Pat. No. 4,294,491 describes a wheel construction having bearing means therein defining an axis of rotation. The bearing means is housed in an elastomeric sleeve having an elastic compressibility characteristic. A pair of identically shaped metallic stampings, each having a central cylindrical shell part axially aligned with the other, is provided for housing the bearing structure therein. Each of the stampings has a surface portion intermediate the central cylindrical shell part and the outer periphery thereof, which are coextensive with a central plane through the wheel construction perpendicular to the axis of rotation. The axially aligned cylindrical shell parts engage at least a portion of the elastomeric sleeve of the bearing structure. An annulus of moldable synthetic resin material is fixedly secured to the peripheral surface of the pair of metallic stampings to hold the cylindrical shell part and the surface portions in axial alignment. The annulus has an elastically flexible characteristic to thereby permit the pair of stampings to shift radially relative to one another while maintaining said surface portions in sliding engagement with one another.

Black, U.S. Pat. No. 4,295,686 describes a wheel construction including a rigid circular disk having a hole therethrough in the approximate center thereof. A bearing structure housed in a flexible sleeve is resiliently supported in the hole to facilitate a rotation of the disk about a defined axis of rotation. An annulus of moldable synthetic resin material is fixedly secured to the peripheral surface of the disk. The annulus has a rigid characteristic and the periphery thereof defines a tread-mounting surface. An annular tread made of moldable synthetic resin material is fixedly secured to the tread mounting surface on the annulus. The tread has an outer diameter that is precisely concentric with the axis of rotation of the wheel. The materials of the tread and of the annulus are compatible with each other such that the tread becomes bonded to the annulus upon a molding thereof around the peripheral surface of the annulus. In one embodiment, the rigid circular disk is composed of a pair of identical metal stampings which are held together solely by the annulus.

Kim et al, U.S. Pat. No. 4,602,822 describes an apparatus for varying eccentrically or centrically the shaft of the bicycle wheel in order that the bicycle can run up and down like horseback riding beside regular level riding. The apparatus has an eccentric hub including a shaft housing formed integrally in eccentric position between two hub discs having an opening and a shaft penetrated through said shaft housing, two circular supporting plates coupled rigidly each other by three connecting rods to reserve revolvably said eccentric hub therebetween, each which has a hub disc housing formed in its eccentric position said hub disc housing has a relatively large hole on its centric portion to exposure the shaft and also a plurality of openings corresponding to different eccentric positions on its circumference of circle, and a resettable spring loaded rod for locking the eccentric hub between the hub disc housings of the circular supporting plates by passing through the openings in alignment with each other.

Tsai, U.S. Pat. No. 4,755,005 describes a hub of a bike or multiple-wheel cycle which is formed with an eccentric wheel or axle in the hub and the eccentric axle having a chain sprocket thereon rotatably mounted with a spindle fixed on a frame fork so that upon the rotation of the axle, the hub and any rear or front wheel secured on the hub will be rotated eccentrically to cause a cam-like action to mimic a horse-riding so as to spur the player or rider interest.

Bach, U.S. Pat. No. 6,019,435 describes a wheel hub with suspension including a carrier arm, a swivel axle and a hub body rotatably secured to the swivel axle. A resilient element is positioned between the carrier arm and the swivel axle. A load on the wheel or the hub body will cause the swivel axle to be displaced relative to the carrier arm, whereby the resilient element is deformed and exercises its resilient effect. The wheel hub may be used in many different applications and for many different types of wheels, such as wheels on vehicles, driving wheels, and support wheels.

The prior art, especially Bach, teaches a shock absorbing system placed within the structure of a wheel such that the wheel hub may be used for providing a smooth support to a rolling vehicle or device such as a skate or bicycle. However, the prior art does not teach that the shock absorbing system may be fitted within the wheel hub in a manner that prevents lateral movement and the related wear of such, eliminates bearing run-out and constitutes a relatively simple design providing for inexpensive construction. The present invention fulfills these needs and provides further related advantages as described in the following summary.

SUMMARY OF THE INVENTION

The present invention teaches certain benefits in construction and use, which give rise to the objectives described below.

A shock absorbing bicycle wheel hub apparatus uses an open ended, cylindrical shock absorber housing mounted concentrically within a wheel hub. The wheel hub is adapted for rotation about the shock absorber housing. A pivot tube is axially aligned with the shock absorber housing and rotationally mounted within its sidewall. Terminal ends of the pivot rod engage cover plates fixedly mounted thereon. A pressure tube is axially aligned with the shock absorber housing and extends through it so that its terminal ends may be fixed in the cover plates. A shock-absorbing medium is compressively positioned between the pressure tube and an interior surface of the shock absorber housing. The cover plates engage a bicycle fork so that weight supported by the bicycle fork is transmitted through the cover plates and the pivot tube and pressure tube, to the shock absorbing medium, and thereby, through the shock absorber housing and the wheel hub to a wheel of the bicycle. Likewise, road shocks are transmitted through the shock-absorbing medium in the same way.

A primary objective of the present invention is to provide an apparatus and method of use of such apparatus that provides advantages not taught by the prior art.

Another objective is to provide such an invention capable of absorbing road shocks.

A further objective is to provide such an invention capable of being constructed at low cost.

A still further objective is to provide such an invention capable of being housed within the hub of a bicycle wheel or other vehicle wheel.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention in at least one of its preferred embodiments, which is further defined in detail in the following description.

Figures 1, 2:
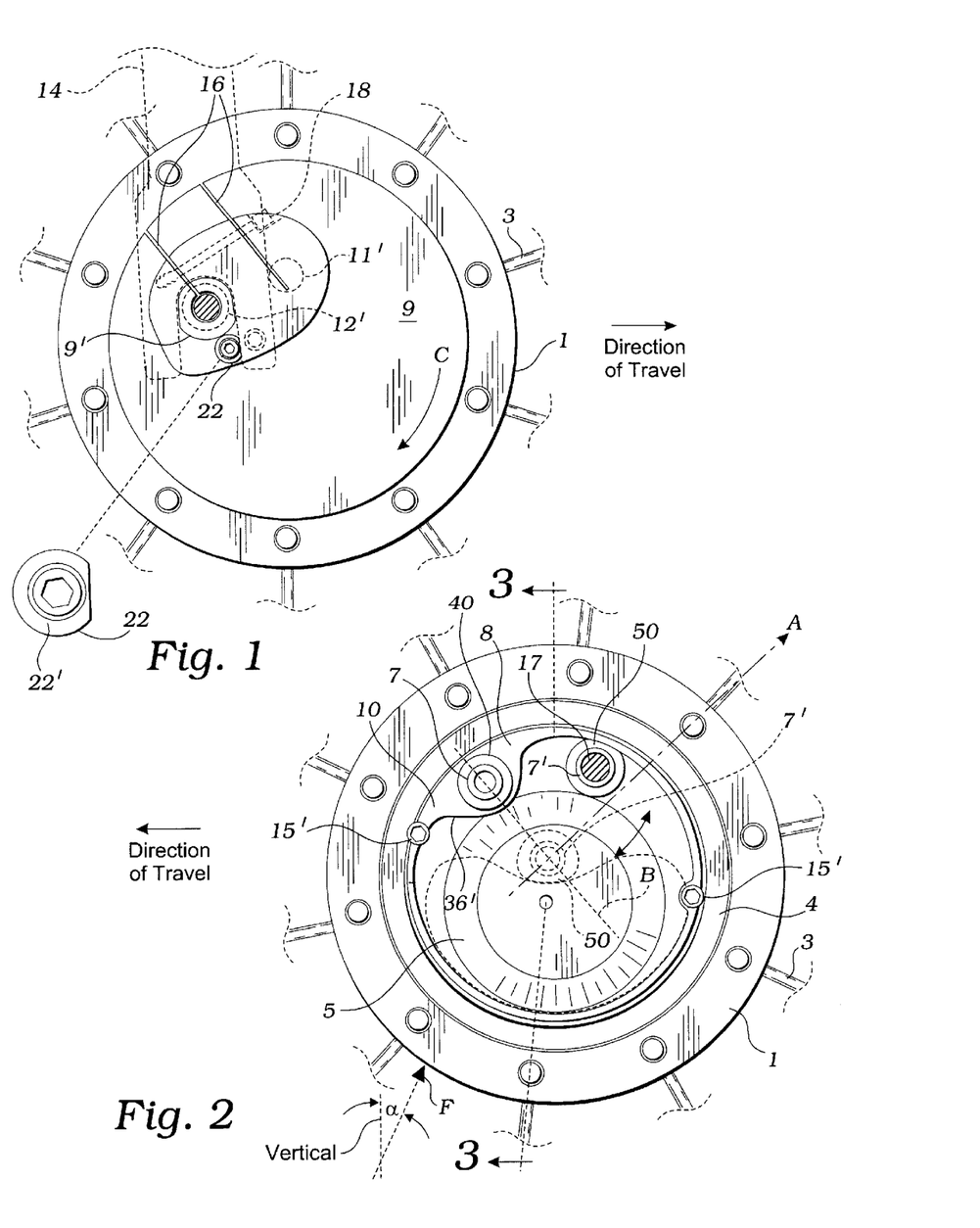
FIG. 1 is a right side elevation view of the preferred embodiment of the invention.
FIG. 2 is a left side elevation view thereof with a hub cover of the invention removed so as to reveal interior detail.
Figure 3:
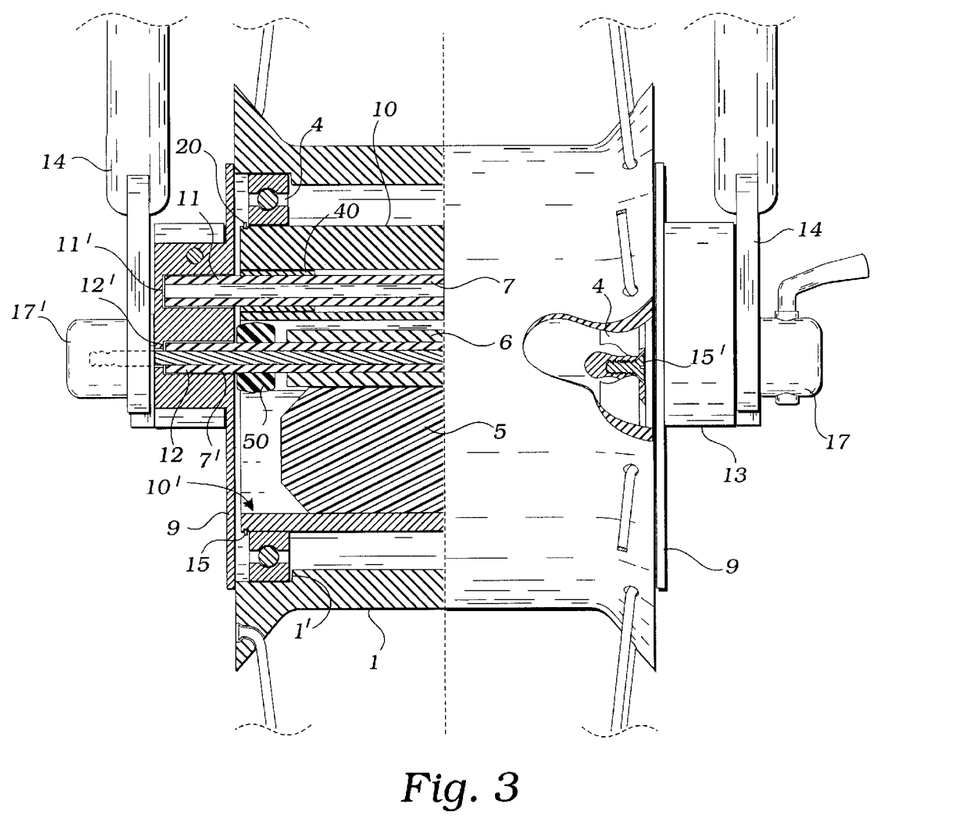
FIG. 3 is a front elevation view thereof shown in half-section taken along line 3—3 in FIG. 2 and showing a first embodiment thereof.
Figures 5, 6:
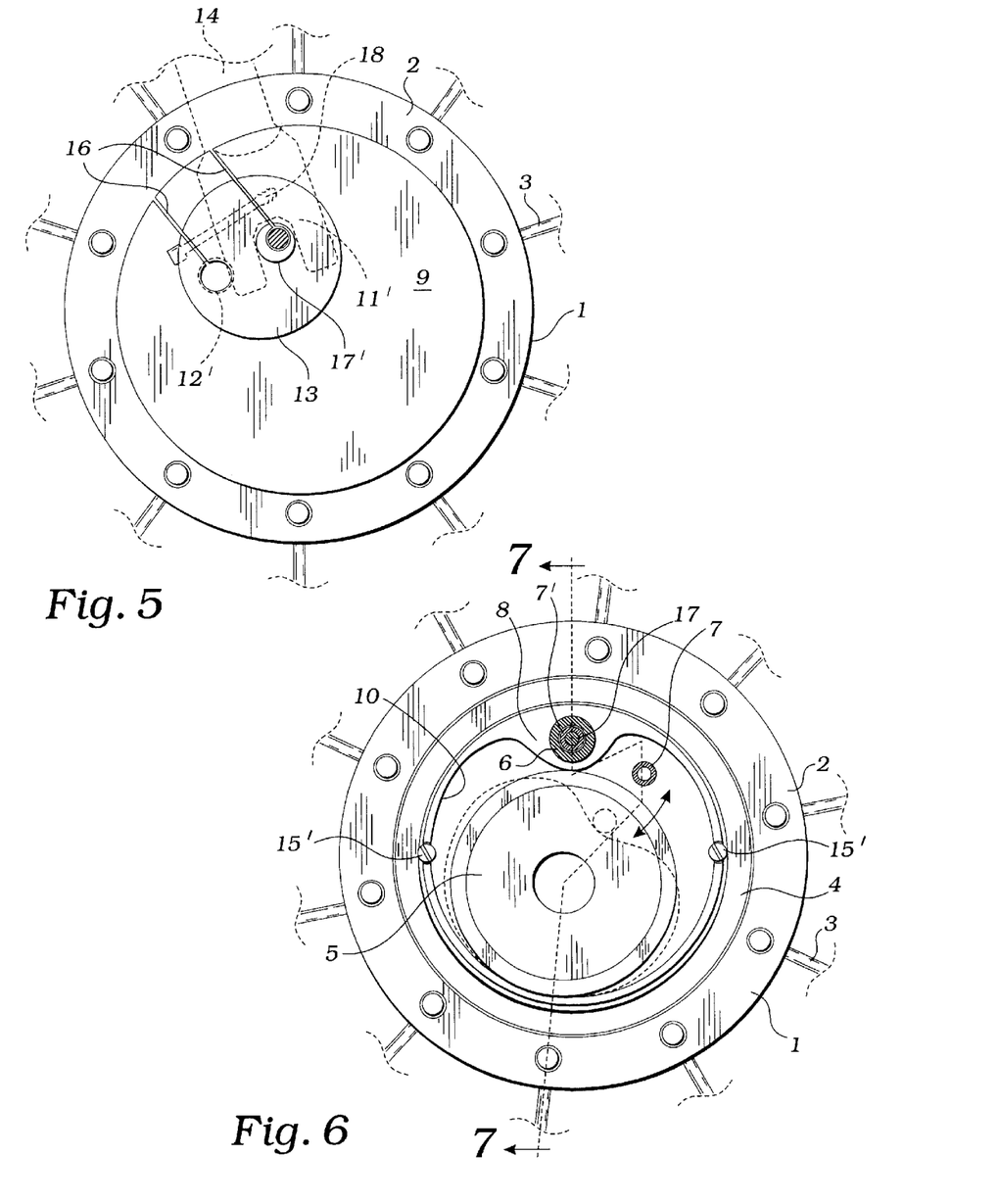
FIGS. 5, 6 and 7 are similar to FIGS. 1, 2 and 3 respectively defining a further embodiment thereof wherein a housing of the invention is made up of three pieces, a central cylinder and opposing end portions inserted within the central cylinder.
Figure 7:
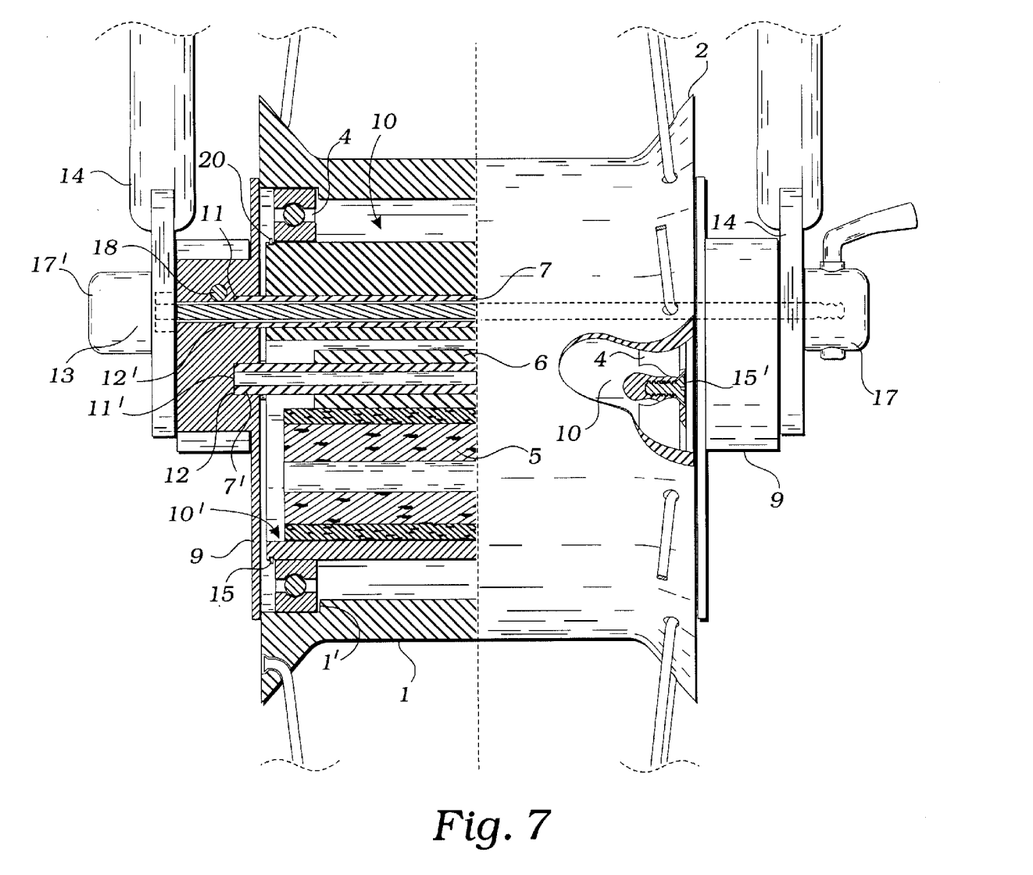

As shown in FIG. 2, a shock absorbing wheel hub apparatus comprises an open ended, cylindrical shock absorber housing 10 mounted concentrically within a wheel hub 1. The wheel hub 1 is adapted for rotation about the shock absorber housing 10 as will be defined below. A pivot rod 7 (or tube) is rotationally mounted within a sidewall inwardly directed portion 8 and rotates within bushings 40. As shown in FIG. 3, terminal ends 11 of pivot rod 7 extend outwardly from open ends of the shock absorber housing 10. Cover plates 9 are fixedly mounted on the terminal ends 11 of the pivot rod 7 for rotation with it. An elevational view of cover plate 9 is shown in FIG. 1. A pressure tube 7' is positioned within shock absorber housing 10 and extends through it with terminal ends 12 of the pressure tube 7' fixedly engaged within the cover plates 9. A shock absorbing medium 5 is compressively positioned between the pressure tube 7' and an interior surface 10' of the shock absorber housing 10. This is clearly shown in FIGS. 2 and 3. The cover plates 9 provide a vehicle engaging means 13 for accepting a vehicle frame member 14, such as a bicycle fork, shown in FIG. 1. The vehicle may be a bicycle, wheel chair, or other similar device. Weight supported by the vehicle's frame is transmitted through the cover plates 9 and the pressure tube 7' to the shock absorbing medium 5, and thereby, through the shock absorber housing 10 and the wheel hub 1 to a wheel 3 of the vehicle. Therefore, roadway shock forces received by the vehicle's wheel 3 are transmitted through the shock absorbing medium 5 to the vehicle's frame 14. The shock absorbing medium 5 is adapted for beneficially changing waveforms of roadway shock forces from sharp spikes or pulses, to more slowly changing waves and is thus able to average such forces over time providing a more comfortable and less jarring ride. In an alternate embodiment shown in FIGS. 5–7, the pivot rod 7 may be configured, not as a rod, but as a tube as shown in FIG. 7, and vehicle mounting hardware is engaged within the pivot rod (tube) 7. Again, both the pivot rod (tube) 7 and the pressure tube 7' are engaged with the cover plates 9 as a rigid assembly. The engaging means 13 is configured to not rotate relative to the vehicle frame member 14, such as by the use of a square boss 9'. In this embodiment, the weight of the vehicle presses directly on the pivot rod (tube) 7. Because the cover plates 9 cannot rotate relative to the vehicle frame member 14, the pivot rod 7 rotates within its bushing and this causes the shock absorber medium 5 to be forced against the pressure rod 7' resulting in a similar suspension action as first described. It is seen in FIG. 5 that the hole 11' is preferably positioned eccentric relative to boss 9' so as to minimize the leverage of the pressure tube 7' against the pivot rod (tube) 7. This occurs due to the shortened distance between the fork's 14 line of action (center line) and the pressure tube 7'. Further, it is noticed in FIG. 6 that holes or depressions 5' are placed in the shock absorbing medium 5, at both ends thereof. These provide improved placement and removal of the medium 5 with respect to the interior of the hub 1. Further to the configuration of the absorbing medium 5, its length is preferably 1.5 times its diameter. This ratio or greater assures that the medium 5 cannot move into an undesired position or attitude within the hub 1.

It is clear from FIG. 2 that the pressure tube 7' moves in an arc about pivot rod 7. Thus, when weight is applied to the frame member 14, as when a rider's weight is applied to the vehicle, pressure tube 7' to forced downwardly compressing shock absorbing medium 5 as shown in FIG. 2 where the position of tube 7' after weight has been applied, is shown with phantom lines. Road shocks cause the same result. In both cases, the shock absorbing medium 5 is able to receive fixed weight changes as well as transient shocks and react by compressing through elastic deformation, and thereafter recover elastically, spreading such forces over time.

The adaptation of the wheel hub 1 for rotation about the shock absorber housing 10 is preferably through a pair of spaced apart bearing assemblies 4 as best seen in FIG. 3. It can be seen in FIG. 3 that a means for eliminating bearing play within the bearing assemblies 4 is enabled. The play eliminating means includes an annular groove 20 in shock absorber housing 10 at both ends, and a removable wire spring retainer 15 inserted into the annular groove 20 and held therein by its own spring action, i.e., the spring is expanded diametrically to place it into groove 20. The retainers 15 abut one of the bearing assemblies 4 at the outside surface of its inner race, as can be clearly seen in FIG. 3 or 4. The play eliminating means further includes plural screws 15' which are threadedly mounted and positioned for compressively engaging the other of the pair of bearing assemblies 4. The screws 15' selectively press against the inner race of the other of the pair of bearing assemblies 4 driving these inner races toward the center of the housing 10, while the corresponding outer race is restricted in its movement by a shoulder 1' of hub 1. Likewise, hub 1 presses against the outer race of the first (left position) bearing assembly 4, which tends to move to the left in FIG. 3, while the corresponding inner race is blocked by spring retainer 15. Therefore, bearing play is adjusted and, if desired, completely eliminated through the tightening of screws 15'.

Preferably, the shock-absorbing medium 5 is of a cellular material such as a urethane or similar substance. Cellular materials are able to assume a smaller volume when under compression and this is highly advantageous in the present application wherein limited space is available within the shock absorber housing 10 for the medium 5 to be displaced under elastic deformation, as shown in FIG. 2. The vehicle engaging means 13, in one embodiment for use with a bicycle, is preferably a pair of bosses 9', one on each of the cover plates 9, as shown in FIG. 1, and which are positioned to receive the bicycle forks, marked with numeral 14 in FIG. 1. To secure the fork 14 in place on the bosses 9' a screw 17 is mounted with a nut 17' as shown in FIG. 3. The screw 17 extends from the cover plate 9 on the right of FIG. 3, through the pressure tube 7' and is then captured by nut 17'. This arrangement is typical for mounting a bicycle wheel to the fork of the bicycle frame. Of course other arrangements for mounting vehicle frames to the cover plates 9 will be obvious to those of skill in the art. Preferably, a tubular sheath 6 is rotationally mounted on the pressure tube 7', as shown in FIG. 3, and positioned for rolling contact with the shock absorbing medium 5 so as to assure rotational movement against the medium 5. In the preferred embodiment, the pivot rod 7, and the pressure tube 7' are both captured, at their ends, 11 and 12 respectively, by holes 11' and 12' respectively, in cover plates 9. The cover plates 9 carry forces from the wheel hub 1 to the medium 5 through the pressure tube 7'.

In the preferred embodiment, and as shown in FIG. 1, cover plates 9 each have two slits 16, which separate the cover plates 9 into three portions. These two slits 16 are cut respectively into holes 11' and 12'. A means for compressing 18, such as the screw shown in FIG. 1 is mounted as shown in FIG. 1 and is enabled for tightening holes 11' and 12' about pivot rod 7 and pressure tube 7' so that these parts are fixedly engaged. This is the primary means for mounting the cover plates 9 so that the several parts 9, 7 and 7' are made into an integral and functional assembly.

Figure 4:
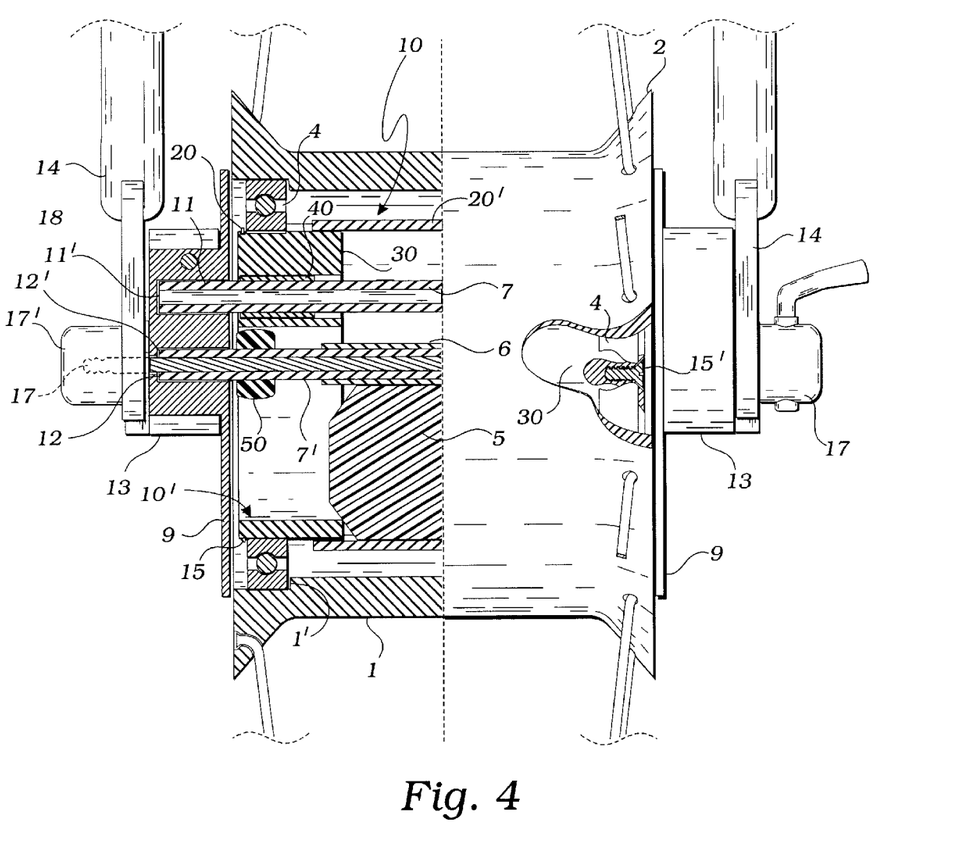
FIG. 4 is similar to FIG. 3 but showing a further embodiment thereof.

In an alternate embodiment, shown in FIG. 4, the shock absorber housing 10 is made-up of a three piece assembly, wherein a center symmetrical tube portion 20' engages, at its opposing ends, end housings 30. In this configuration, medium 5 is given greater room to expand laterally when compressed. The three pieces may be a press fit or otherwise permanently joined. A pivot rod bushing 40 of any well known bushing material such as beryllium copper, is pressed into each end housing 30, as shown, so that pivot rod 7 is able to more easily rotate with less friction. A pair of elastomeric cylindrical elements 50 are mounted in spaced apart positions on the pressure tube 7' as shown in FIGS. 3 and 4. These cylindrical elements 50 act as a bumper when the vehicle is lifted so that pressure tube 7' is in its extreme upward end of motion against surface 10'. Elements 50 also act to force pressure tube 7' into a preloaded position against medium 5.

Referring now to FIG. 2, it is seen that under normal loading, medium 5 is partially compressed (phantom position of pressure tube 7' and medium 5) supporting the weight of the vehicle and its occupants. Should the wheel 3 leave the ground for any reason, the medium 5 resumes its rest state configuration; in this case round, and pressure tube 7' moves to its extreme unloaded position shown with solid lines. Assuming again that the pressure tube 7' is in the phantom position as the vehicle moves over the ground, when the wheel 3 encounters a bump in the terrain, the wheel 3 will move momentarily upwardly causing the medium 5 to become more greatly compressed. In effect, road bumps cause the medium 5 to be driven upwardly against the pressure tube 7' which is held in place by the vehicle's frame 14. It should be noted that line B, the straight line between the center points of pivot rod 7 and pressure tube 7', determines how shocks are absorbed by medium 5. It should be noted that the typical road bump force vector acting on wheel 3 is as shown by arrow F in FIG. 2. That is, force vector F is not vertical, but rather acts off the vertical by anywhere from 10 to 50 degrees away from the direction of motion. Thus relative to the vertical, the force vector F is generally off-of-vertical by an angle defined here as angle $\alpha$. Line A is orthogonal to line B and is the direction in which the pressure tube 7' moves initially when medium 5 exerts an upward pressure on it. When the angle of line A and the force vector F are aligned, the force F is optimally absorbed, i.e., both its horizontal and its vertical components are absorbed equally as well by medium 5. Let us assume that line B is horizontal so that line A is along the true vertical. In this case, the vertical component of force F is optimally absorbed, but the horizontal component of force F is not absorbed at all. Likewise, if line B is vertical so that line A is horizontal, the vertical component of force F is minimally absorbed, and the horizontal component of force F is optimally absorbed. Therefore, it can be seen that by setting the initial position of line B, it is possible to preset the suspension characteristic of this invention.

This is accomplished as shown in FIG. 1. Here, the vehicle engaging means 13 is enabled with two key components: the boss 9' which receives fork 14, and a bushing 22 which is held by a screw 22' threaded into engaging means 13. Plural positions of bushing 22 may be selected using plural threaded holes. Preferably bushing 22 is eccentric so that by fixing it in selected rotational positions about its own holding screw 22', it determines the rotational orientation of the cover plate 9, as shown by arrow C in FIG. 1. This, of course, determines the rotational orientation of lines B and A, shown in FIG. 2. Thus, we have a means for the adjustment of line A relative to the vertical, where line A defines the initial direction of motion of the shock absorber housing when a force is applied to it as has been discussed. The foregoing defines a means for determining an initial angular direction of motion of the pressure tube and a means for adjustment of the initial angular direction of motion of the pressure tube.

Figure 8:
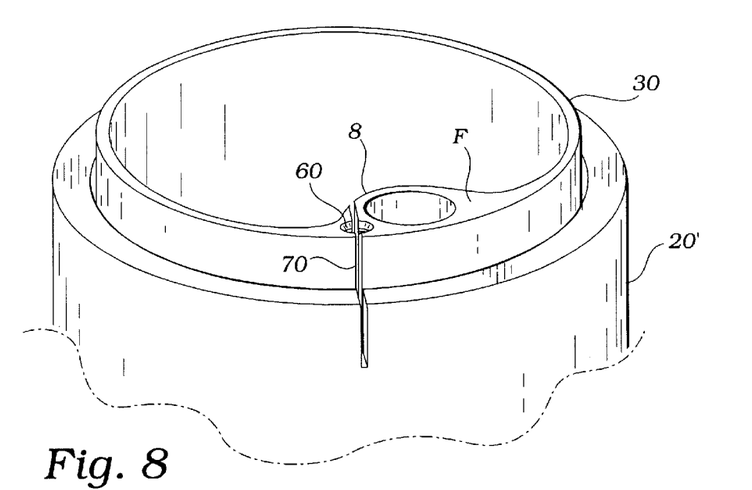
FIG. 8 is a perspective view of a portion of the housing showing the central cylinder and one of the end portions, a slit extending through both ports.
Figure 9:
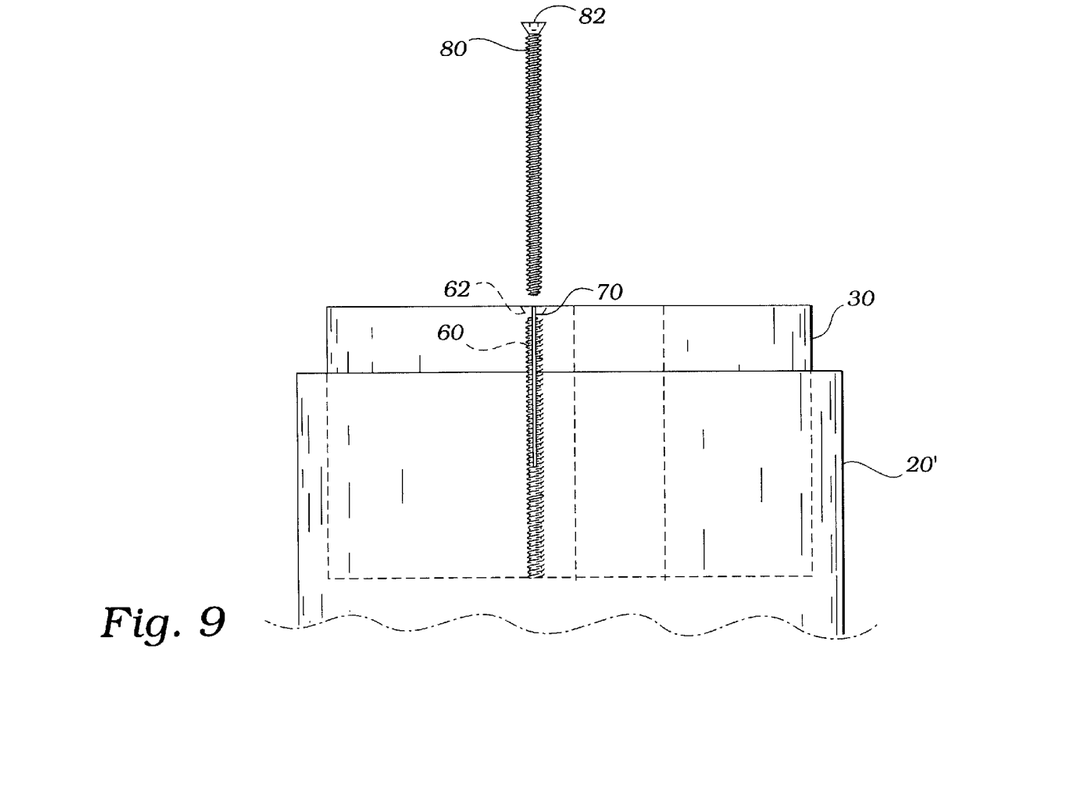
FIG. 9 is an exploded view of the subject of FIG. 8 showing a screw and screw hole in elevation.

As shown in FIG. 8, each of the inwardly directed sidewall portions 8 of housing 10 or end housings 30 provide an exterior lateral face 'F" with an axially directed slit 70 therein, the slit 70 extending axially but not fully through the end housing 30 as is shown best in FIG. 9. Centered on the slit 70, as shown in FIG. 8, is an axially directed hole 60 having a machine-screw thread formed therein. The hole 60 provides a tapered entry portion 62, shown in FIG. 9. A machine screw 80 is threaded within the hole 60, the machine screw 80 providing a head 82 with a tapered sidewall, whereby, with the tapered sidewall of the head 82 in contact with the tapered entry portion 62 of the hole 60, the slit 70 may be widened according to the penetration depth of the machine screw 80 within the threaded hole 60, and such widening enables engagement of the end housing 30 within bearing assembly 4, shown in FIG. 3 and the center symmetrical tube portion 20'.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A shock absorbing bicycle wheel hub apparatus comprising: a cylindrical shock absorber housing mounted concentrically within a wheel hub of a bicycle wheel; a pivot tube rotationally mounted within spaced apart inwardly directed sidewall portions of the shock absorber housing; terminal ends thereof each engaging one of a pair of cover plates positioned laterally to the shock absorber housing; a pressure tube engaged with the cover plates, and a shock absorbing medium positioned between the pressure tube and the shock absorber housing; whereby as the pivot tube rotates within the inwardly directed sidewall portion, the pressure tube and cover plates move arcuately relative to the shock absorber housing, the pressure tube compressing the shock absorbing medium; the cover plates providing bicycle fork engaging means for suspending said bicycle fork laterally to the pivot tube.

2. The apparatus of claim 1 further comprising rotational bearing means mounted between the shock absorber housing and the wheel hub for improved rotation of the wheel hub about the shock absorber housing.

3. The apparatus of claim 1 further comprising a fork securement comprising a threaded rod extending through the pivot tube and the cover plates for engaging locking means in lateral opposition to a bicycle fork mounted on the bicycle fork engaging means.

4. The apparatus of claim 1 wherein each of the bicycle fork engaging means of the cover plates comprises an integral, laterally protruding boss, the boss positioned eccentrically to the pivot rod.

5. The apparatus of claim 1 wherein the shock absorbing medium provides depressions placed at opposing ends thereof.

6. The apparatus of claim 1 wherein the shock absorbing medium has a length to diameter ratio of at least 1.5.

7. The apparatus of claim 1 wherein the shock absorber housing provides a means for expansion of opposing ends thereof for improved engagement with a bearing means.

8. The apparatus of claim 7 wherein the expansion means comprises a threaded fastening means; expansion of the opposing ends corresponding to positioning thereof.

9. The apparatus of claim 8 wherein the threaded fastening means comprises a split tapered first annular surface in contact with a tapered second annular surface, the second annular surface moving axially within the first annular surface for adjusting the slit tapered first annular surface.

* * * * *